United States Patent
Rollins

(10) Patent No.: US 12,539,721 B2
(45) Date of Patent: Feb. 3, 2026

(54) RFID PACKAGE FOR A TIRE

(71) Applicant: Bridgestone Americas Tire Operations, LLC, Nashville, TN (US)

(72) Inventor: Claude D. Rollins, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 79 days.

(21) Appl. No.: 18/290,860

(22) PCT Filed: Aug. 8, 2022

(86) PCT No.: PCT/US2022/074693
§ 371 (c)(1),
(2) Date: Jan. 22, 2024

(87) PCT Pub. No.: WO2023/034676
PCT Pub. Date: Mar. 9, 2023

(65) Prior Publication Data
US 2024/0253403 A1    Aug. 1, 2024

Related U.S. Application Data

(60) Provisional application No. 63/238,508, filed on Aug. 30, 2021.

(51) Int. Cl.
 G08B 25/10  (2006.01)
 B60C 19/00  (2006.01)
(52) U.S. Cl.
 CPC .................................. B60C 19/00 (2013.01)
(58) Field of Classification Search
 CPC .... B22C 9/04; B22C 9/10; B22C 7/02; B22C 9/02; B22C 9/108; B22C 9/24; A61B 6/4258; B23P 15/246; B29C 33/301; B29C 33/38; B29C 33/3835; B29C 48/09; B29C 48/21; B29C 48/32; B29C 48/338;
(Continued)

(56) References Cited

U.S. PATENT DOCUMENTS 4,216,667 A    8/1980  Otsuka et al.
6,591,074 B1 *  7/2003  Michlin ............. G03G 15/0894
                                        399/106
(Continued)

FOREIGN PATENT DOCUMENTS

JP    2008-137615    6/2008
JP    2013-112342    6/2013
KR    101059589    5/2009

OTHER PUBLICATIONS

International Search Report and Written Opinion; Corresponding PCT Application Serial No. PCT/US2022/074693; Authorized Officer Kee Wan Hong; Dec. 5, 2022.
(Continued)

*Primary Examiner* — Daniel Previl

(57) ABSTRACT

An RFID package for a tire includes a first laminate layer having a first length, a first width, and a first thickness. The RFID package further includes a second laminate layer having a second length, a second width, and a second thickness. An RFID chip is disposed between the first laminate layer and the second laminate layer. At least one of the second length, the second width, and the second thickness is different from the first length, the first width, and the first thickness, respectively.

20 Claims, 17 Drawing Sheets

(58) Field of Classification Search
CPC ..... B29C 49/041; B29C 70/22; B29C 70/382;
B29C 70/543; B29C 2948/92019; B29C
2948/92409; B29C 2948/92514; B29C
2948/92571; B29C 2948/9258; B29C
2948/92647; B29C 2948/92904; B29C
2948/92942; B29C 48/2694; B29C
48/325; B29C 48/475; B29C 48/48; B29C
48/92; B29C 49/04102; B29C 49/22;
C08L 63/00; C08L 83/04; Y10T
428/24479; B22D 25/02; B22D 29/001;
B22D 29/04; F01D 25/12; F01D 5/147;
F01D 5/18; F01D 9/02; F05D 2220/30;
F05D 2220/32; F05D 2230/21; F05D
2230/211; F05D 2300/20; A61N 1/0551;
A61N 1/0556; A61N 1/375; A61N
2005/063; A61N 2005/0651; A61N
2005/0659; A61N 5/0601; A61N 5/0622;
A61N 5/067; A63C 5/003; A63C 5/12;
A63C 5/126; B29L 2031/5263; B32B
2535/00; B32B 38/0012
USPC ..... 340/539.1, 572.1–572.8, 539.13, 539.22,
340/539.12, 568.1, 641, 687, 691.6
See application file for complete search history.

(56) References Cited

U.S. PATENT DOCUMENTS

| | | | |
|---|---|---|---|
| 8,430,142 | B2 | 4/2013 | Incavo |
| 10,025,960 | B1* | 7/2018 | Fink ........................ H04L 5/08 |
| 10,150,267 | B2 | 12/2018 | Tucker |
| 2004/0057747 | A1* | 3/2004 | Michlin ............. G03G 15/0884 399/106 |
| 2006/0123899 | A1* | 6/2006 | Nakao ................. B60C 23/0493 73/146 |
| 2009/0303044 | A1* | 12/2009 | Furuichi .......... G06K 19/07381 340/568.1 |
| 2010/0212791 | A1* | 8/2010 | Incavo ................ B60C 23/0493 235/487 |
| 2010/0258227 | A1 | 10/2010 | Kuroki |
| 2011/0113630 | A1 | 5/2011 | Bell |
| 2011/0198402 | A1 | 8/2011 | Tucker |
| 2016/0175091 | A1* | 6/2016 | Van Heugten ............ A61F 2/14 623/6.22 |
| 2020/0070598 | A1* | 3/2020 | Noel ..................... B29C 33/424 |
| 2020/0164605 | A1 | 5/2020 | Yoshida |
| 2020/0282291 | A1* | 9/2020 | Heil ........................ B29C 70/22 |
| 2020/0306526 | A1* | 10/2020 | Doguet .................. A61N 1/375 |
| 2021/0053306 | A1* | 2/2021 | Cassidy .................. B60C 19/00 |

OTHER PUBLICATIONS

Rebecca Wilmot; Adhesives for RFID Bonding; Industry Applications; https://www.permabond.com/resource-center/adhesives-rfid-bonding; Permabond Engineering Adhesives; May 4, 2017.

Tire Adhesive Solutions; https://www.lord.com/products-and-solutions/rubber-bonding/chemlok-vulcanizing-adhesives/tires; Tire Adhesive Solutions; Date unknown.

Passive Alien H3 UHF Patch RFID Tire Tag For Truck Tire Management Car Tyre Tags Like Unique Michelin Tire Identification Number Long Reading Range For Vehichle Tire manager; https://www.kimeeryrfidtag.com/uhf-rfid-tag/uhf-vehicle-rfid-tag/passive-alien-h3-uhf-patch-rfid-tire-tag-for.html; Kimeery (Xiamen) Intelligent Technology Co., Ltd; Date unknown.

* cited by examiner

RFID PACKAGE FOR A TIRE

FIELD OF INVENTION

The present disclosure relates to tires. More particularly, the present disclosure relates to an RFID package for mounting to a tire.

BACKGROUND

Known tires and tire systems incorporate electronic devices. These devices are used for a variety of purposes, such as, for example, product identification, memory storage, and tire analysis. The electronic devices are incorporated into tires and tire systems at various locations on tires, vehicles, or attendant proximity readers. Known electronic devices include, for example, RFID chips and antennas.

In the tire industry, RFID chips may be provided in a tire as part of an RFID package. Prior art FIGS. 12 and 13 show a side view and an end view, respectively, of an RFID package 1005 that generally includes a first laminate layer 1010 and a second laminate layer 1015 that sandwich an RFID chip 1020. The first laminate layer 1010 and the second laminate layer 1015 are substantially identical to one another, and have the same length, width, and uniform thickness. The RFID package 1005 may be mounted to a tire using an embedded arrangement or a surface mount arrangement. In the embedded arrangement the RFID package 1005 is disposed between layers of the tire. In the surface mount arrangement, the RFID package 1005 is disposed on an interior-most or exterior-most surface of the tire.

While methods of embedding an RFID into a tire may hold the RFID package more securely compared to a surface mount arrangement, the embedded arrangement may complicate the tire manufacturing process because the RFID package is added to the tire as the tire is built up. Although it is possible to cut a manufactured tire subsequent to its manufacture in order to add an RFID package, such process may negatively affect the structural integrity of the tire and, therefore, may be undesirable. In comparison, surface mount RFID packages can be added at any time during the tire manufacturing process or even at any time after the tire has been manufactured. Surface mount RFID packages, however, may create issues during manufacture, as the presence of the RFID package may cause cracking in the tire structure during certain steps in the tire manufacturing process.

Therefore, what is needed is an RFID package that can be surface mounted while avoiding the above discussed issues regarding crack formation.

SUMMARY OF THE INVENTION

In one embodiment, an RFID package for a tire includes a first laminate layer having a first length, a first width, and a first thickness. The RFID package further includes a second laminate layer having a second length, a second width, and a second thickness. An RFID chip is disposed between the first laminate layer and the second laminate layer. At least one of the second length, the second width, and the second thickness is different from the first length, the first width, and the first thickness, respectively.

In another embodiment, an RFID package for a tire includes a first laminate layer having a first central portion and a first peripheral portion. The RFID package further includes a second laminate layer having a second central portion and a second peripheral portion. An RFID chip is disposed between the first laminate layer and the second laminate layer. The first laminate layer is tapered so that a thickness of the first central portion is greater than a thickness of the first peripheral portion.

In yet another embodiment, a method of manufacturing an RFID package includes forming a first laminate layer having a first taper and forming a second laminate layer having a second taper. The method further includes providing an RFID chip between the first laminate layer and the second laminate layer. The first laminate layer is secured to the second laminate layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
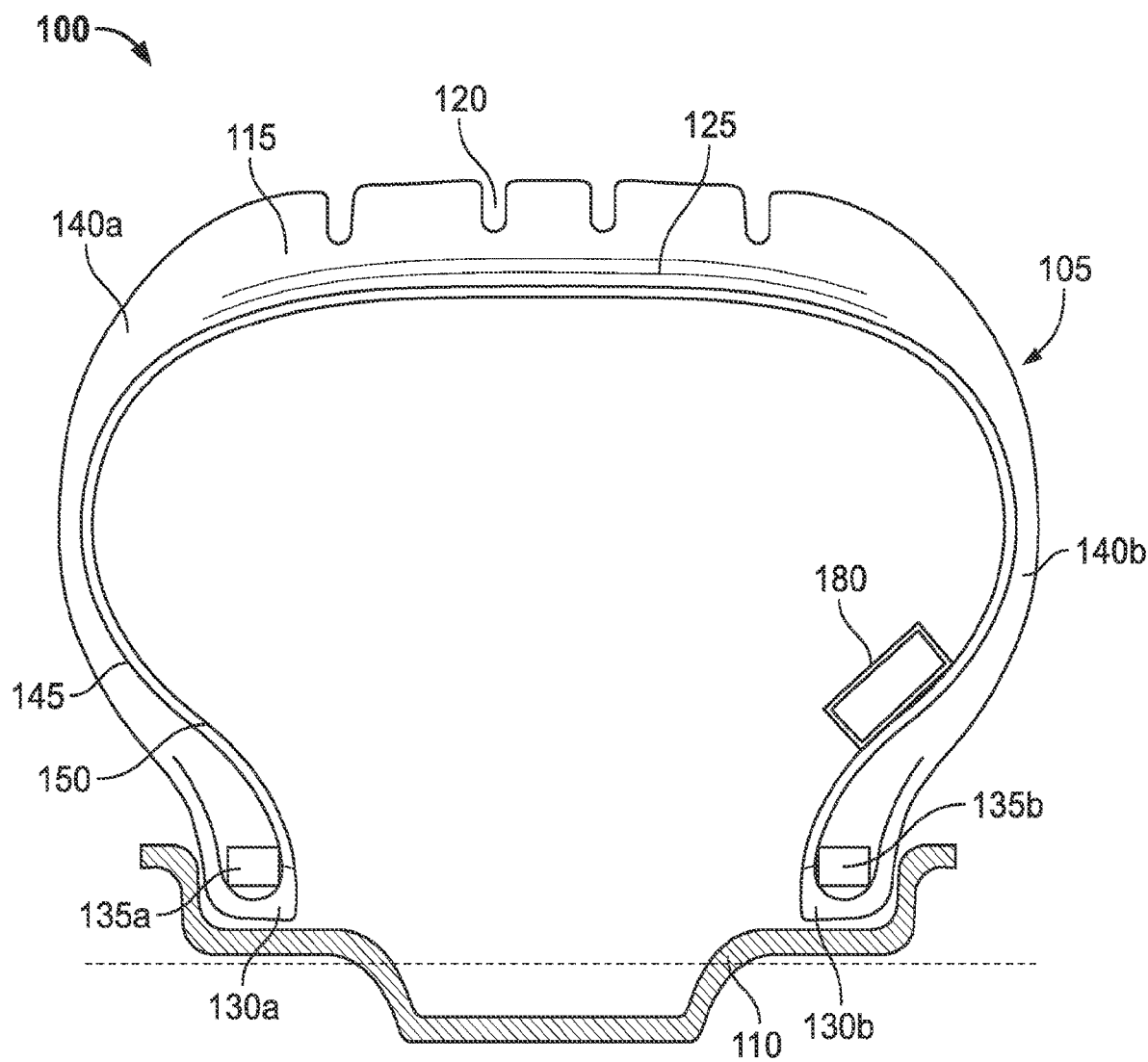
FIG. 1 is a cross-section of an exemplary tire with an RFID package (shown schematically) installed therein.

FIG. 1 is a cross-section of a tire 100 having an RFID package 180 installed therein. The tire 100 is merely exemplary, and it should be understood that the RFID package 180 may be installed in any desired tire having any type of configuration.

The tire 100 is mounted on a wheel 110. The tire 105 includes a circumferential tread 115 in a crown region of the tire. In the illustrated embodiment, the tread 115 includes a plurality of circumferential grooves 120. While four grooves 120 are shown, it should be understood that any number of grooves may be employed. The tread 115 may further include ribs, blocks, lugs, lateral grooves, sipes, or any other desired tread elements. The crown region of the tire 105 further includes a pair of belts 125. In alternative embodiments (not shown), any number of belts or cap plies may be employed.

In the illustrated embodiment, the tire 105 further includes a first bead portion 130a and a second bead portion 130b. The bead portions 130a, b include a first bead 135a and a second bead 135b, respectively, which are shown schematically in FIG. 1. The bead portions 130a, b may also include one or more bead fillers (not shown) and other known components such as abrasions, chafers, or reinforcements.

A first sidewall 140a extends between the tread 115 and the first bead portion 130a. Similarly, a second sidewall 140b extends between the tread 115 and the second bead portion 130b. The sidewalls 140a, b may include any number of reinforcements (not shown). A carcass ply 145 extends from the first bead portion 130a, through the first and second sidewalls 140a and the crown portion, to the second bead portion 130b. An innerliner 150b is disposed radially under the carcass ply 145. In alternative embodiments, any number of carcass plies may be employed. In other alternative embodiments, the innerliner may be omitted.

The RFID package 180 is affixed to the innerliner 150b adjacent the second sidewall 140b. In alternative embodiments, the RFID package may be affixed to the innerliner at any location on the tire. In other alternative embodiments, when the innerliner is omitted, the RFID package may be affixed to the interior-most surface of the tire. In another alternative embodiment, the RFID package may be affixed to an exterior surface of the tire. In still yet other alternative embodiments, the RFID package may be affixed to any desired surface of the tire, or to any desired layer of the tire, or located between any desired layers of the tire.

Figure 2:
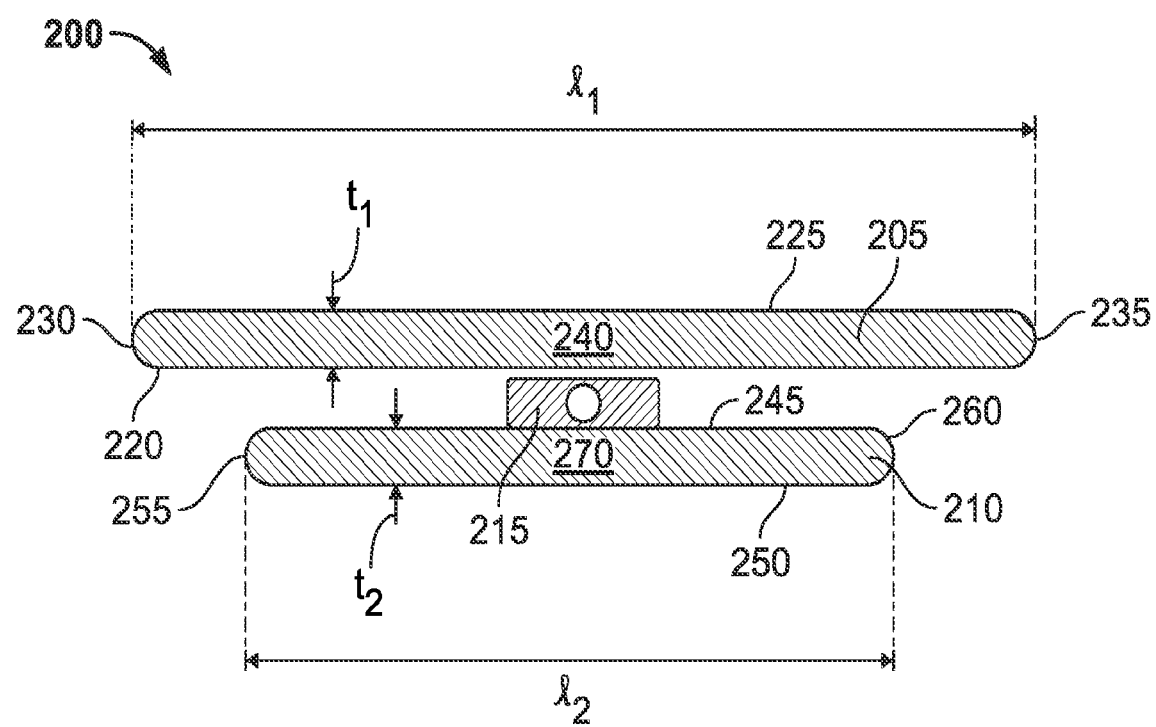
FIG. 2 is an exploded side view of one embodiment of an RFID package that can be used in the tire of FIG. 1.
Figure 3:
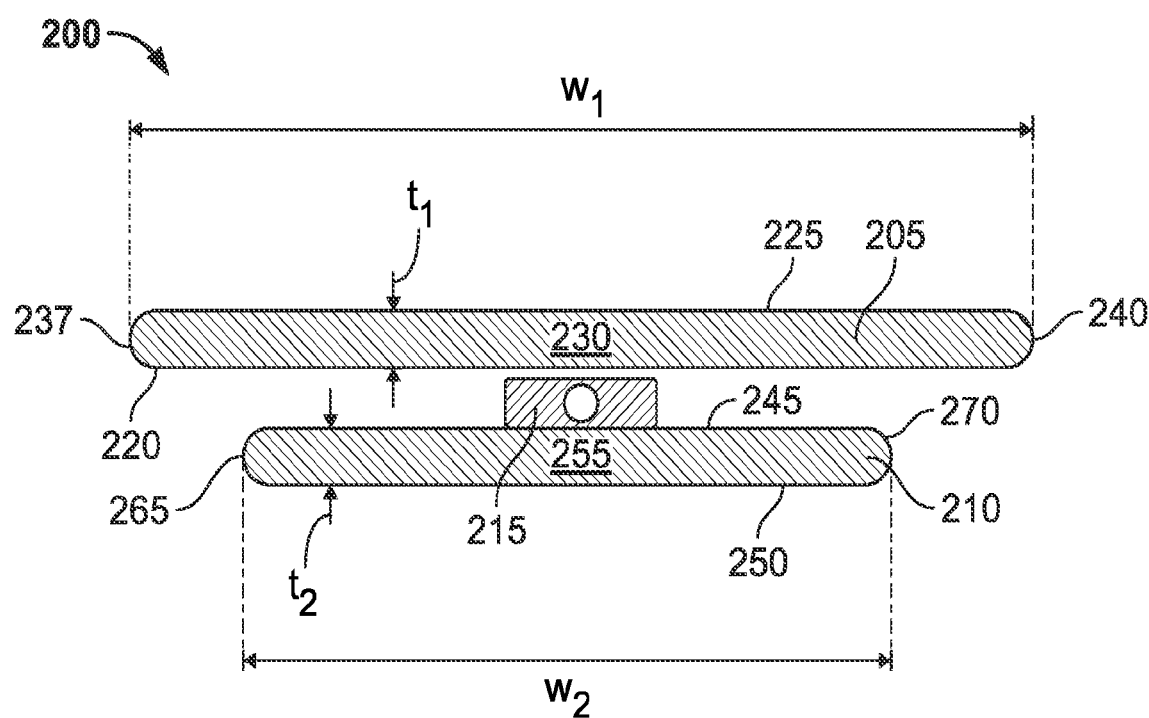
FIG. 3 is an exploded end view of the RFID package of FIG. 2.
Figure 4:
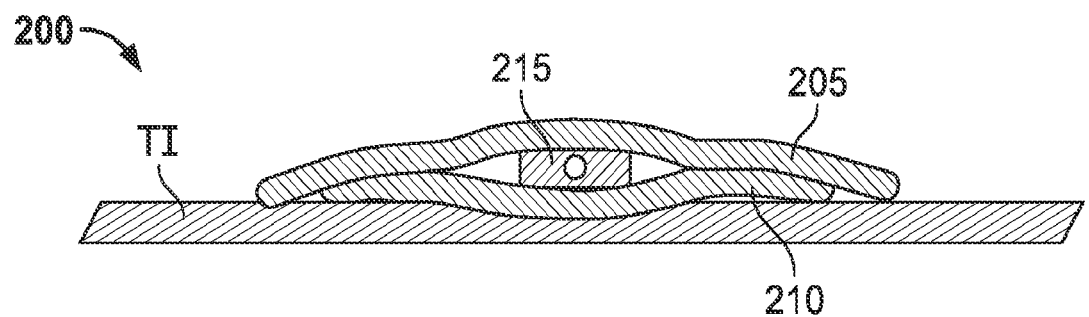
FIG. 4 is a side view of the RFID package of FIG. 2 in an assembled state and affixed to a tire innerliner.

FIGS. 2-4 show one embodiment of an RFID package 200 that can be installed on a tire. The RFID package 200 includes a first laminate layer 205 and a second laminate layer 210. As used herein, the second laminate layer 210 refers to the layer that engages with a surface of the tire. An RFID chip 215 is sandwiched between the first laminate layer 205 and the second laminate layer 210.

The first laminate layer 205 includes a first surface 220 and a second surface 225 that faces opposite the first surface 220. The first and second surfaces 220, 225 each extend between a first end 230 and a second end 235, as well as between a first side 237 and a second side 240. The first laminate layer 205 has a length $l_1$ that is measured as the distance between the first end 230 and the second end 235, a width $w_1$ that is measured as the distance between the first side 237 and the second side 240, and a thickness $t_1$ that is measured as the distance between the first surface 220 and the second surface 225. It should be understood that the length $l_1$, width $w_1$, and thickness $t_1$ identifiers are provided only to facilitate description of the RFID package 200 and are in no way meant to limit the disclosure of the laminate layer to a particular orientation. In other words, length, for example, is not meant to limit the associated discussion to only the longest extent of the first laminate layer. In the illustrated embodiment, the first laminate layer 205 is provided as a substantially rectangular sheet of material. In alternative embodiments, the first laminate layer may be provided as any desired shape.

The second laminate layer 210 includes a first surface 245 and a second surface 250 that faces opposite the first surface 245. The first and second surfaces 245, 250 each extend between a first end 255 and a second end 260, as well as between a first side 265 and a second side 270. The second laminate layer 210 has a length $l_2$ that is measured as the distance between the first end 255 and the second end 260, a width $w_2$ that is measured as the distance between the first side 265 and the second side 270, and a thickness $t_2$ that is measured as the distance between the first surface 245 and the second surface 250. It should be understood that the length $l_2$, width $w_2$, and thickness $t_2$ identifiers are provided only to facilitate description of the RFID package 200 and are in no way meant to limit the disclosure of the laminate layer to a particular orientation. In other words, length, for example, is not meant to limit the associated discussion to only the longest extent of the second laminate layer. In the illustrated embodiment, the second laminate layer 210 is provided as a substantially rectangular sheet of material. In alternative embodiments, the second laminate layer may be provided as any desired shape.

As shown in FIG. 4, a portion of the first surface 220 of the first laminate layer 205 is attached to a portion of the first surface of the second laminate layer 210 to secure the RFID chip 215 therebetween. The laminate layer surfaces may be secured together using, for example, adhesives, fusing (e.g., welding), mechanical fasteners, or any other materials or processes. According to one exemplary process, the laminate layers are made of uncured rubber. In this example, the uncured rubber laminate layers are pressed together mechanically and adhere due to the natural tackiness of the uncured rubber.

The second laminate layer 210 is attached to a tire innerliner TI, thereby attaching the RFID package 200 to the tire. According to one embodiment, the laminate layers 205, 210 and the RFID chip 215 may be affixed to the innerliner TI during a tire molding process. The laminate layers 205, 210 and the RFID chip 215 may, for example, be placed on the innerliner TI, and a cure bladder expands during vulcanization and presses the laminate layers 205, 210 and the RFID chip 215 against the tire innerliner TI as the laminates and innerliner cure together. In alternative embodiments, the laminates and the RFID chip may be affixed to the innerliner using any desired process or at any time during the tire manufacturing process.

The length $l_2$ and the width $w_2$ of the second laminate layer 210 is less than the length $l_1$ and the width $w_1$ of the first laminate layer 205. Preferably, the length $l_2$ of the second laminate layer 210 is in the range of 70-90% of the length $l_1$ of the first laminate layer 205, and the width $w_2$ of the second laminate layer is in the range of 50-70% of the width $w_1$ of the first laminate layer 205. More preferably, the length $l_2$ of the second laminate layer 210 is in the range of 70-85% of the length $l_1$ of the first laminate layer 205, and the width $w_2$ of the second laminate layer is in the range of 50-65% of the width $w_1$ of the first laminate layer 205. Even more preferably, the length $l_2$ of the second laminate layer 210 is in the range of 73-83% of the length $l_1$ of the first laminate layer 205, and the width $w_2$ of the second laminate layer is in the range of 53-65% of the width $w_1$ of the first laminate layer 205. The thickness $t_1$ of the first laminate layer 205 is substantially the same as the thickness $t_2$ of the second laminate layer 210.

According to one example, the first laminate layer 205 has a length $l_1$ of 80 mm, a width $w_1$ of 20 mm, and a thickness $t_1$ of 1.2 mm, while the second laminate layer 210 has a length $l_2$ of 70 mm, a width $w_2$ of 10 mm, and a thickness $t_2$ of 1.2 mm. Thus, in this example the length $l_2$ of the second laminate layer 210 is 85% of the length $l_1$ of the first laminate layer 205, and the width $w_2$ of the second laminate layer 210 is 50% of the width $w_1$ of the first laminate layer 205. In alternative embodiments, the second laminate layer may have a length or a width that is any desired percentage of the length and the width, respectively, of the first laminate layer. This may include, for example, arrangements where the length of the second laminate layer is equal to the length of the first laminate layer, or arrangements where the width of the second laminate layer is equal to the width of the first laminate layer. In other alternative embodiments, the first laminate layer and the second laminate layer may have different thicknesses.

It has been found that in the RFID package 200 of FIGS. 2-4, the use of laminate layers having different lengths or widths decreases the possibility of cracks forming in the tire structure during the manufacturing process. In prior applications in which a first laminate layer and a second laminate layer have the same dimensions, it has been found that the laminate layers and innerliner cure at different rates, so that the laminate layers are completely cured before a seam between the laminate layers and the innerliner disappears. By contrast, it has been found that providing the above described RFID package 200 wherein the first laminate layer 205 and the second laminate layer 210 have the above described relative lengths and widths can reduce the seam between the laminate layers and the innerliner. The reduction of the seam consequently reduces the occurrence of cracks forming in the tire structure during manufacturing while still providing a robust mounting arrangement that minimizes the chances of the RFID package 200 separating from the tire structure.

Figure 5:
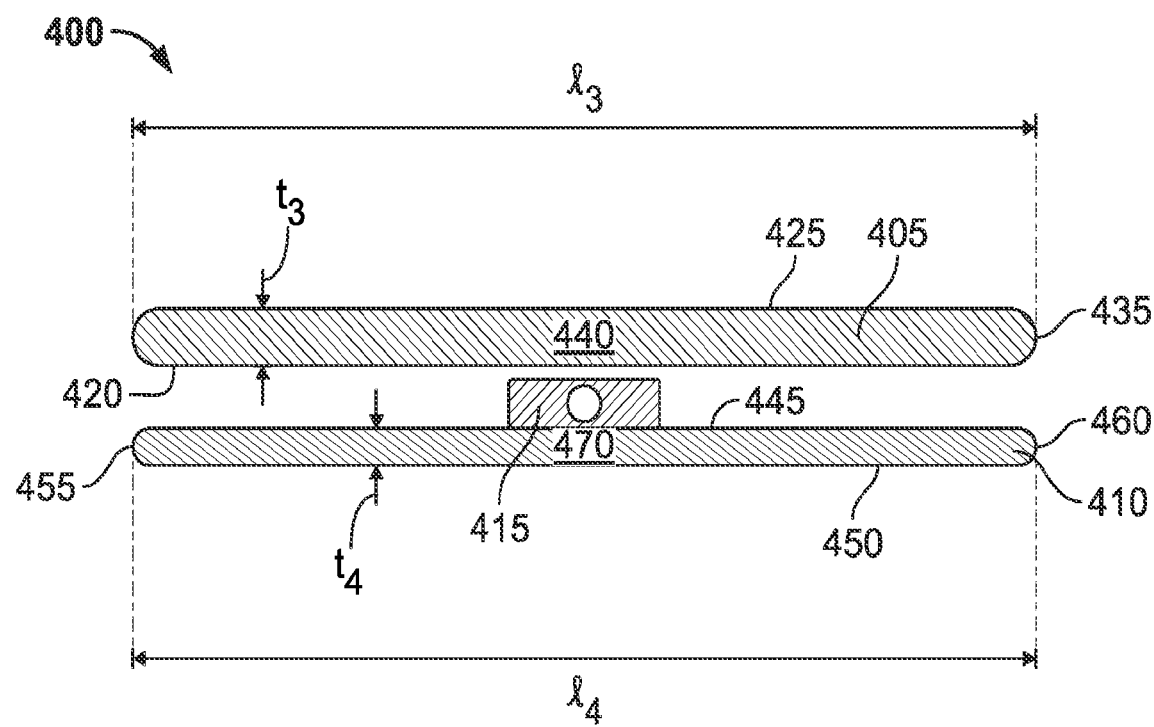
FIG. 5 is an exploded side view of another embodiment of an RFID package that can be used in the tire of FIG. 1.
Figure 6:
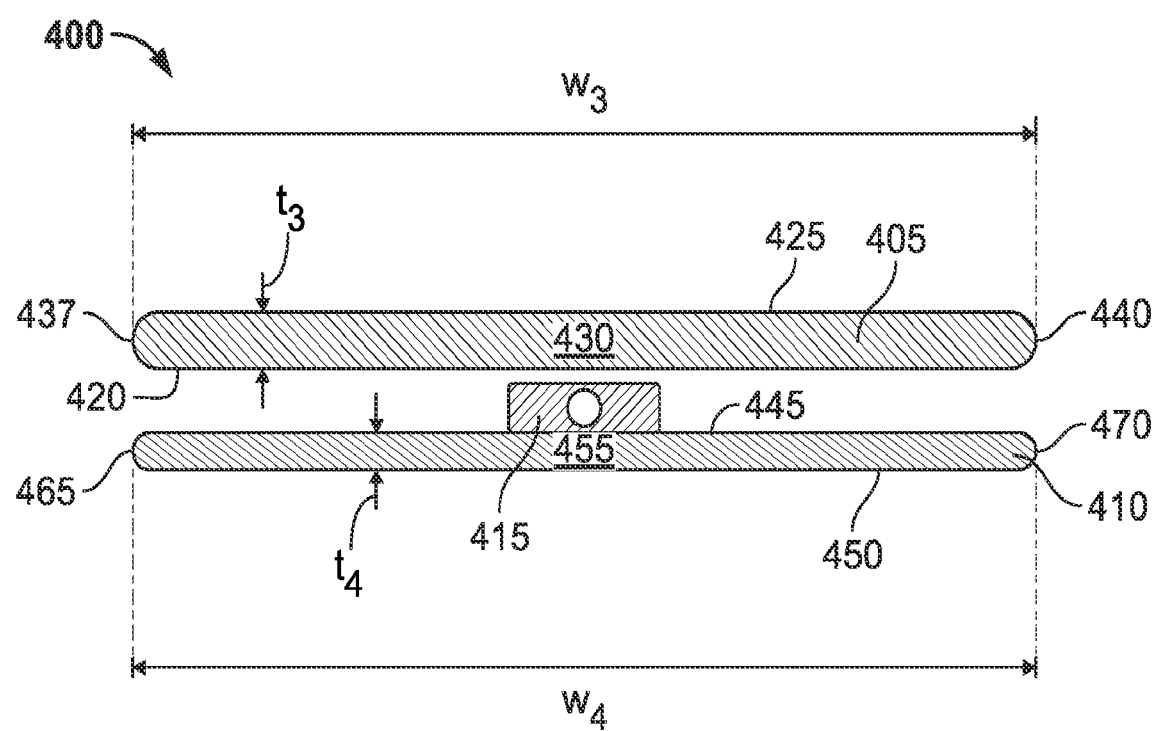
FIG. 6 is an exploded end view of the RFID package of FIG. 5.
Figure 7:
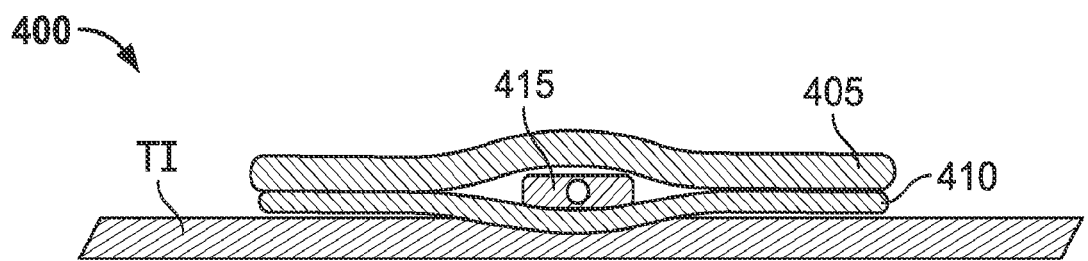
FIG. 7 is a side view of the RFID package of FIG. 5 in an assembled state and affixed to a tire innerliner.

FIGS. 5-7 show an alternative embodiment of an RFID package 400 that can be installed on a tire. The RFID package 400 includes a first laminate layer 405 and a second laminate layer 410. As used herein, the second laminate layer 410 refers to the layer that engages with a surface of the tire. An RFID chip 415 is sandwiched between the first laminate layer 405 and the second laminate layer 410.

The first laminate layer 405 includes a first surface 420 and a second surface 425 that faces opposite the first surface 420. The first and second surfaces 420, 425 each extend between a first end 430 and a second end 435, as well as between a first side 437 and a second side 440. The first laminate layer 405 has a length $l_3$ that is measured as the distance between the first end 430 and the second end 435, a width $w_3$ that is measured as the distance between the first side 437 and the second side 440, and a thickness $t_3$ that is measured as the distance between the first surface 420 and the second surface 425. It should be understood that the length $l_3$, width $w_3$, and thickness $t_3$ identifiers are provided only to facilitate description of the RFID package 400 and are in no way meant to limit the disclosure of the laminate layer 405 to a particular orientation. In other words, length, for example, is not meant to limit the associated discussion to only the longest extent of the first laminate layer. In the illustrated embodiment, the first laminate layer 405 is provided as a substantially rectangular sheet of material. In alternative embodiments, the first laminate layer may be provided as any desired shape.

The second laminate layer 410 includes a first surface 445 and a second surface 450 that faces opposite the first surface 445. The first and second surfaces 445, 450 each extend between a first end 455 and a second end 460, as well as between a first side 465 and a second side 470. The second laminate layer 410 has a length $l_4$ that is measured as the distance between the first end 455 and the second end 460, a width $w_4$ that is measured as the distance between the first side 465 and the second side 470, and a thickness $t_4$ that is measured as the distance between the first surface 445 and the second surface 450. It should be understood that the length $l_4$, width $w_4$, and thickness $t_4$ identifiers are provided only to facilitate description of the RFID package 400 and are in no way meant to limit the disclosure of the laminate layer to a particular orientation. In other words, length, for example, is not meant to limit the associated discussion to only the longest extent of the second laminate layer. In the illustrated embodiment, the second laminate layer 410 is provided as a substantially rectangular sheet of material. In alternative embodiments, the second laminate layer may be provided as any desired shape.

As shown in FIG. 7, a portion of the first surface 420 of the first laminate layer 405 is attached to a portion of the first surface of the second laminate layer 410 to secure the RFID chip 415 therebetween. The laminate layer surfaces may be secured together using, for example, adhesives, fusing (e.g., welding), mechanical fasteners, or any other materials or processes. According to one exemplary process, the laminate layers are made of uncured rubber. In this example, the uncured rubber laminate layers are pressed together mechanically and adhere due to the natural tackiness of the uncured rubber. The second laminate layer 410 is attached to a tire innerliner TI, thereby attaching the RFID package 400 to the tire. According to one embodiment, the laminate layers 405, 410 and the RFID chip 415 may be affixed to the innerliner TI during a tire molding process. The laminate layers 405, 410 and the RFID chip 415 may, for example, be placed on the innerliner TI, and a cure bladder expands during vulcanization and presses the laminate layers 405, 410 and the RFID chip 415 against the tire innerliner TI as the laminates and innerliner cure together. In alternative embodiments, the laminates and the RFID chip may be affixed to the innerliner using any desired process or at any time during the tire manufacturing process.

The thickness $t_4$ of the second laminate layer 410 is less than the thickness $t_3$ of the first laminate layer 405. Preferably, the thickness $t_4$ of the second laminate 410 layer is 50-75% the thickness $t_3$ of the first laminate layer 405. More preferably, the thickness $t_4$ of the second laminate layer 410 is 55-70% the thickness $t_3$ of the first laminate layer 405. Even more preferably, the thickness $t_4$ of the second laminate 410 layer is 60-67% the thickness $t_3$ of the first laminate layer 405. The length $l_3$ and the width $w_3$ of the first laminate layer 405 are substantially the same as length $l_4$ and the width $w_4$ of the second laminate layer 410.

According to one example, the first laminate layer 405 has a length $l_3$ of 80 mm, a width $w_3$ of 20 mm, and a thickness $t_3$ of 1.2 mm, while the second laminate layer 410 has a length $l_4$ of 80 mm, a width $w_4$ of 20 mm, and a thickness $2_4$ of 0.6 mm. Thus, the thickness $t_4$ of the second laminate layer 410 is 50% of the thickness $t_3$ of the first laminate layer 405. In alternative embodiments, the second laminate layer may have a thickness that is any desired percentage of the thickness of the first laminate layer. In other alternative embodiments, the first laminate layer and the second laminate layer may have different lengths or widths.

It has been found that in the RFID package 400 of FIGS. 5-7, the use of laminate layers having different thicknesses decreases the possibility of cracks forming in the tire structure during the manufacturing process. In prior applications in which a first laminate layer and a second laminate layer have the same dimensions, it has been found that the laminate layers and innerliner cure at different rates, so that the laminate layers are completely cured before a seam between the laminate layers and the innerliner disappears. By contrast, it has been found that providing the above described RFID package 400 wherein the first laminate layer 405 and the second laminate layer 410 have the above described relative thicknesses can reduce the seam between the laminate layers and the innerliner. The reduction of the seam consequently the occurrence of cracks forming in the tire structure during manufacturing while still providing a robust mounting arrangement that minimizes the chances of the RFID package 400 separating from the tire structure.

Figure 8:
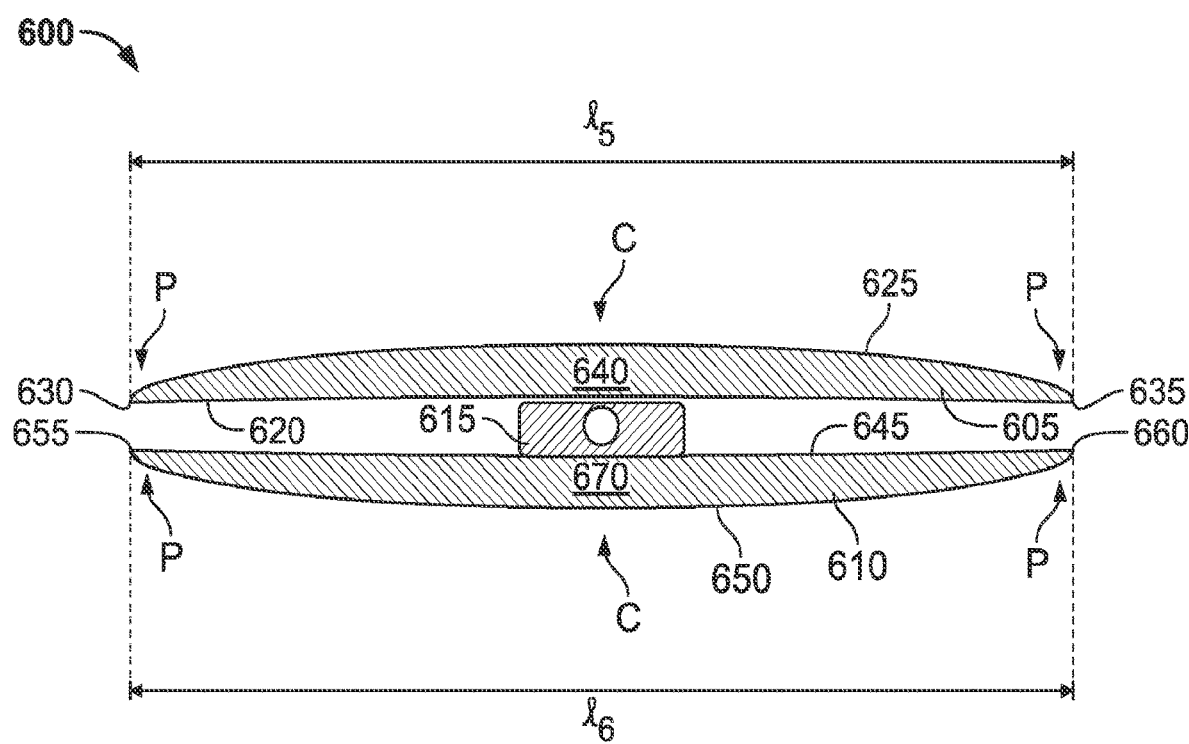
FIG. 8 is an exploded side view of another embodiment of an RFID package that can be used in the tire of FIG. 1.
Figure 9:
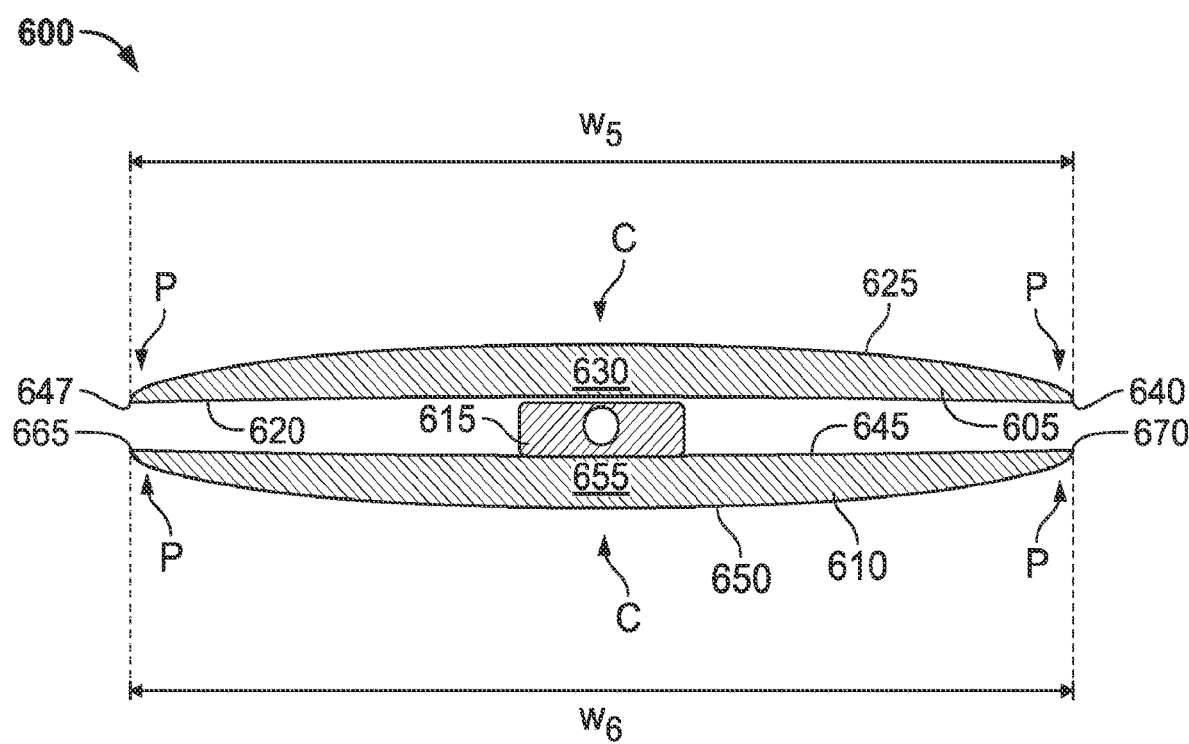
FIG. 9 is an exploded end view of the RFID package of FIG. 8.
Figure 10:
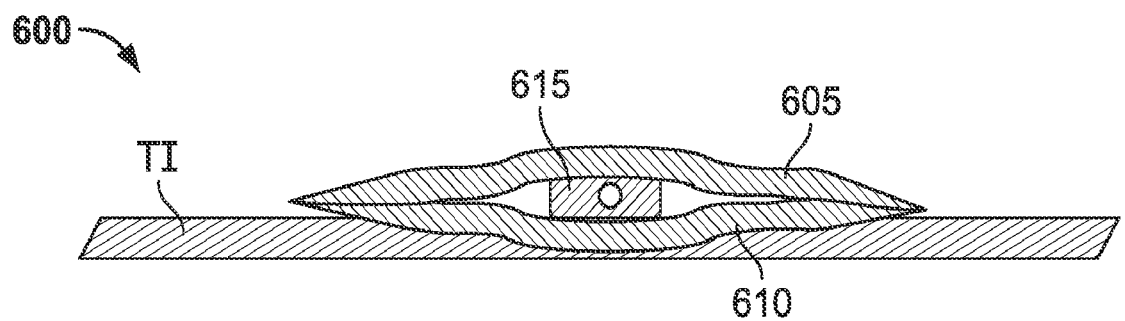
FIG. 10 is a side view of the RFID package of FIG. 8 in an assembled state and affixed to a tire innerliner.

FIGS. 8-10 show another alternative embodiment of an RFID package 600 that can be installed on a tire. The RFID package 600 includes a first laminate layer 605 and a second laminate layer 610. As used herein, the second laminate layer 610 refers to the layer that engages with a surface of the tire. An RFID chip 615 is sandwiched between the first laminate layer 605 and the second laminate layer 610.

The first laminate layer 605 includes a first surface 620 and a second surface 625 that faces opposite the first surface 620. The first and second surfaces 620, 625 each extend between a first end 630 and a second end 635, as well as between a first side 637 and a second side 640. The first laminate layer 605 has a length $l_5$ that is measured as the distance between the first end 630 and the second end 635, a width $w_5$ that is measured as the distance between the first side 637 and the second side 640, and a thickness $t_3$ that is measured as the distance between the first surface 620 and the second surface 625. It should be understood that the length $l_5$, width $w_5$, and thickness $t_3$ identifiers are provided only to facilitate description of the RFID package 600 and are in no way meant to limit the disclosure of the laminate layer to a particular orientation. In other words, length, for example, is not meant to limit the associated discussion to only the longest extent of the first laminate layer. In the illustrated embodiment, the first laminate layer 605 is provided as a substantially rectangular sheet of material. In alternative embodiments, the first laminate layer may be provided as any desired shape.

The second laminate layer 610 includes a first surface 645 and a second surface 650 that faces opposite the first surface 645. The first and second surfaces 645, 650 each extend between a first end 655 and a second end 660, as well as between a first side 665 and a second side 670. The second laminate layer 610 has a length $l_6$ that is measured as the distance between the first end 655 and the second end 660, a width $w_6$ that is measured as the distance between the first side 665 and the second side 670, and a thickness $t_6$ that is measured as the distance between the first surface 645 and the second surface 650. It should be understood that the length $l_6$, width $w_6$, and thickness $t_6$ identifiers are provided only to facilitate description of the RFID package 600 and are in no way meant to limit the disclosure of the laminate layer to a particular orientation. In other words, length, for example, is not meant to limit the associated discussion to only the longest extent of the second laminate layer. In the illustrated embodiment, the second laminate layer 210 is provided as a substantially rectangular sheet of material. In alternative embodiments, the second laminate layer may be provided as any desired shape.

As shown in FIG. 10, a portion of the first surface 620 of the first laminate layer 605 is attached to a portion of the first surface 645 of the second laminate layer 610 to secure the RFID chip 615 therebetween. The laminate layer surfaces may be secured together using, for example, adhesives, fusing (e.g., welding), mechanical fasteners, or any other materials or processes. According to one exemplary process, the laminate layers are made of uncured rubber. In this example, the uncured rubber laminate layers are pressed together mechanically and adhere due to the natural tackiness of the uncured rubber. The second laminate layer 610 is attached to a tire innerliner TI, thereby attaching the RFID package 600 to the tire. According to one embodiment, the laminate layers 605, 610 and the RFID chip 615 may be affixed to the innerliner TI during a tire molding process. The laminate layers 605, 610 and the RFID chip 615 may, for example, be placed on the innerliner TI, and a cure bladder expands during vulcanization and presses the laminate layers 605, 610 and the RFID chip 615 against the tire innerliner TI as the laminates and innerliner cure together. In alternative embodiments, the laminates and the RFID chip may be affixed to the innerliner using any desired process or at any time during the tire manufacturing process.

The dimensions of the first laminate layer 605 and the second laminate layer 610 are substantially equal to one another. The first laminate layer 605 and the second laminate layer 610 each have a tapered thickness. As used herein, tapered means that, beginning at a central portion C on the laminate layer and moving outward toward a peripheral portion P (i.e., the first and second ends and the first and second edges) the thickness of the laminate layer gradually decreases. The taper may be formed by a roller die or a skive knife.

In the illustrated embodiment, the taper is arranged so that the first surface 625 of the first laminate layer 605 and the first surface 650 of the second laminate layer 610 are arcuate and configured so that each of the laminate layers 605, 610 has a substantially half-moon-shaped cross section. Additionally, in the illustrated embodiment, the taper is arranged so as to extend along both the length and the width of each of the laminate layers 605, 610. Furthermore, in the illustrated embodiment, the taper is arranged so as to extend continuously from the central portion C all the way to both the ends and the sides of each of the laminate layers 605, 610.

In alternative embodiments, the taper may arranged to give the laminate layers any desired cross section. For example, the taper may be arranged so that each laminate layer has a substantially triangular-shaped cross section. In other alternative embodiments, the first laminate layer may have a taper that is different from a taper of the second laminate layer. In still yet other alternative embodiments, the taper may be arranged so that a laminate layer is tapered only along its length but not its width, or so that a laminate layer is tapered only along its width but not its length. In still yet even other alternative embodiments, the taper may be arranged so as to not extend continuously from a central point to the ends or the sides of a laminate layer. For example, the taper may be arranged so as to begin midway between a central point and an edge or side. As another example, the taper may be arranged so as to only extend along part of a distance between a central point and an edge or side.

It has been found that in the RFID package 600 of FIGS. 8-10, the user of laminate layers having a tapered arrangement decreases the possibility of cracks forming in the tire structure during the manufacturing process. In prior applications in which a first laminate layer and a second laminate layer have the same dimensions, it has been found that the laminate layers and innerliner cure at different rates, so that the laminate layers are completely cured before a seam between the laminate layers and the innerliner disappears. By contrast, it has been found that providing the above described RFID package 600 wherein the laminate layers 605, 610 are tapered as described above can reduce the seam between the laminate layers and the innerliner. The reduction of the seam consequently reduces the occurrence of cracks forming in the tire structure during manufacturing while still providing a robust mounting arrangement that minimizes the chances of the RFID package 600 separating from the tire structure.

While discrete embodiments and variants have been shown and described in FIGS. 2-10, the disclosed features are not exclusive to each embodiment. Instead, various features can be combined in an RFID package as desired. For example, a single laminate layer (i.e., one of the first or second laminate layers) of an RFID package may include both a tapering feature as shown in FIGS. 8-10 and a reduced thickness feature as shown in FIGS. 5-7. As another example, one laminate layer may have only the reduced thickness feature as shown FIGS. 5-7 and the other laminate layer of the same RFID package may have only the tapering feature as shown in FIGS. 8-10.

Figure 11:
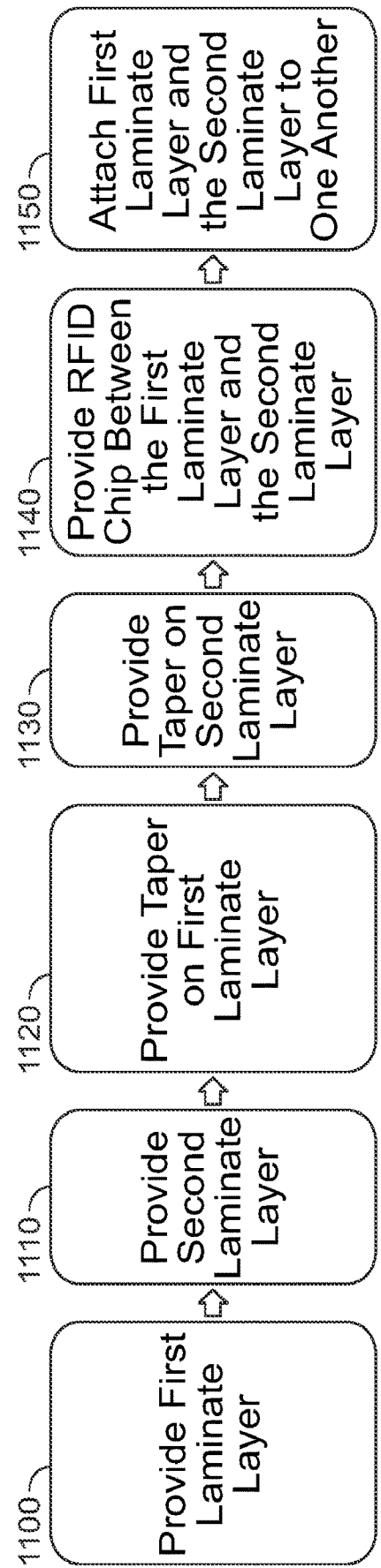
FIG. 11 is a flow diagram that illustrates an exemplary method of manufacturing an RFID package.
Figure 12:
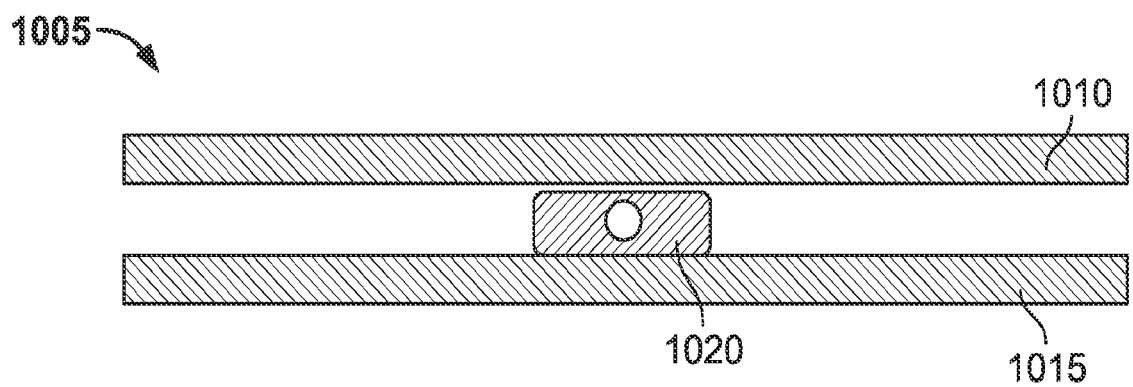
FIG. 12 is a side view of a prior art RFID package.
Figure 13:
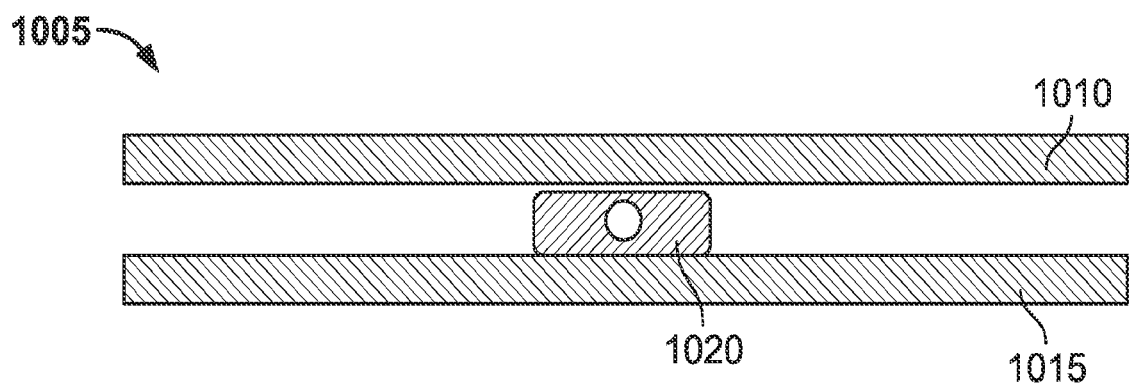
FIG. 13 is an end view of the prior art RFID package of FIG. 12.

FIG. 11 shows an exemplary method of manufacturing an RFID package. At 1100, a first laminate layer is provided. At 1110, a second laminate layer is provided. According to one example, forming the first laminate layer or the second laminate layer includes stamping a laminate layer of a desired size from a stock piece of material. In alternative embodiments, the first laminate layer or the second laminate layer may be formed by any desired process. At 1120, the first laminate layer is provided with a taper. At 1130, the second laminate layer is provided with a taper. The taper may be provided by any desired process including, for example, extrusion by a fixed or rolling die, or skiving with angled knives. At 1140, an RFID chip is provided between the first laminate layer and the second laminate layer. At 1150, the first laminate layer and the second laminate layer are attached to one another to secure the RFID chip therein. The first laminate layer and the second laminate layer may be attached using, for example, adhesives, fusing (e.g., welding), or mechanical fasteners, or any other materials or processes. According to one exemplary process, the laminate layers are made of uncured rubber. In this example, the uncured rubber laminate layers are pressed together mechanically and adhere due to the natural tackiness of the uncured rubber.

In alternative embodiments, the foregoing steps may occur in an order other than what is specifically described. In other alternative embodiments, the method may include a greater or fewer number of steps. For example, an extruding process may be used to combine the steps of forming a laminate layer and providing the laminate layer with a taper, whereby material is extruded with a die having a tapered shape.

Figure 14:
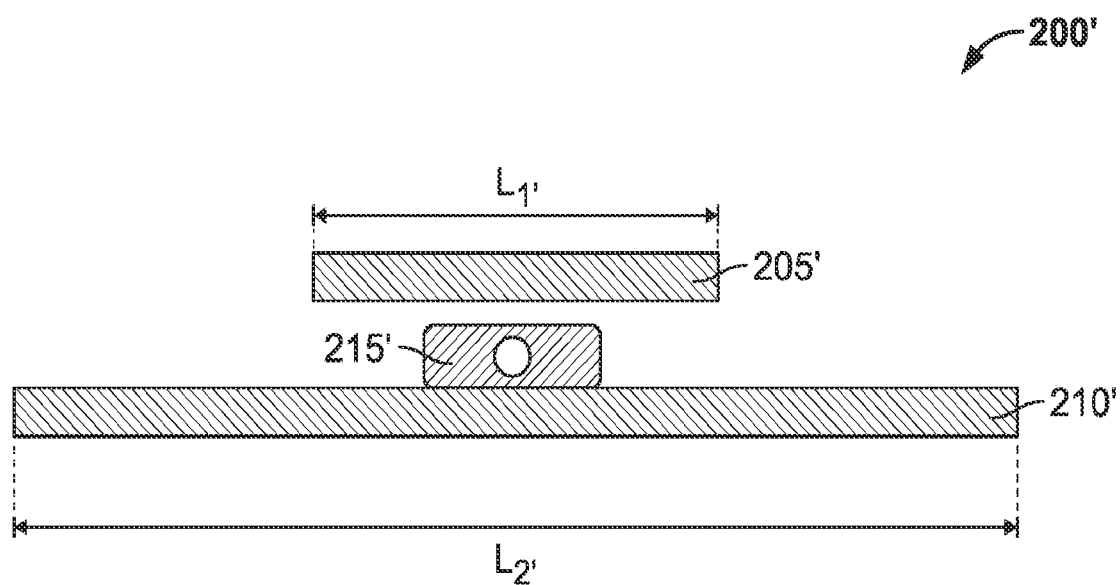
FIG. 14 is an exploded side view of a yet another embodiment of the RFID package of FIGS. 2-4.
Figure 15:
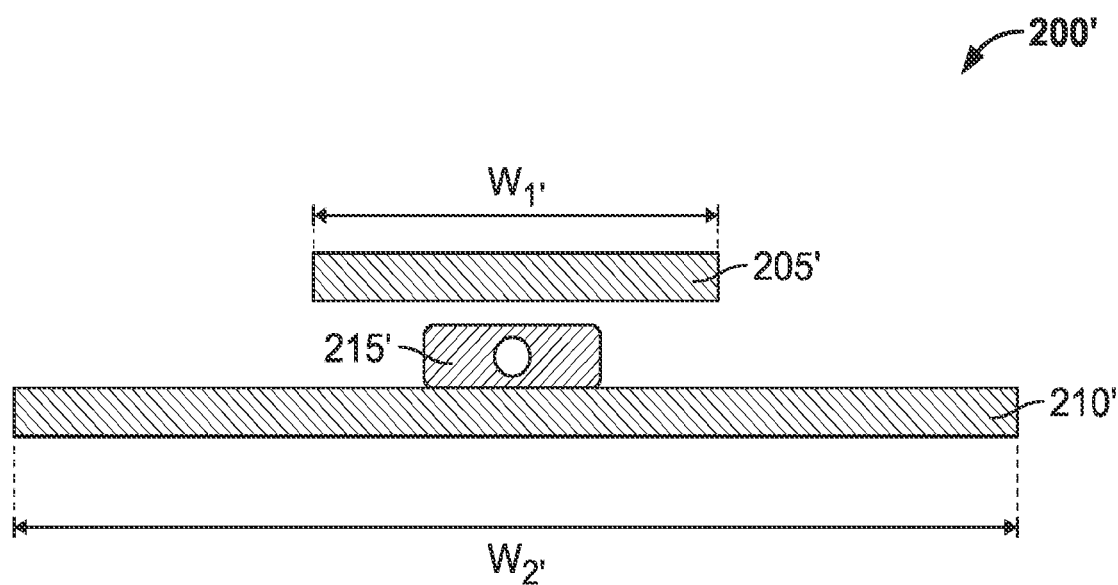
FIG. 15 is an exploded end view of the RFID package of FIG. 14.

FIGS. 14 and 15 show yet another embodiment of an RFID package 200'. The RFID package 200' of FIGS. 14 and 15 and the RFID package 200 of FIGS. 2-4 are substantially the same except for any differences described herein. Accordingly, like features will be identified by like numerals with the addition of a prime (').

The RFID package 200' includes a first laminate layer 205' and a second laminate layer 210'. An RFID chip 215' is sandwiched between the first and second laminate layers 205', 210'. A length $l_{1'}$ and a width $w_{1'}$ of the first laminate layer 205' is less than a length $l_{2'}$ and a width $w_{2'}$ of the second laminate layer 210'.

Similar to the arrangement of the RFID package 200 of FIGS. 2-4, the arrangement of the RFID package 200' of FIGS. 14 and 15 can reduce a seam between the laminate layers 205', 210' and an innerliner of a tire in which the RFID package 200' is used. As explained above, this reduces the occurrence of cracks forming in the tire structure during manufacturing.

Similar to the embodiments shown in FIGS. 2-4, a bottom surface of the first laminate layer 205 is attached to a top surface of the second laminate layer 210' to secure the RFID chip 215' therebetween. The second laminate layer 210' is attached to a tire innerliner, thereby attaching the RFID package 200' to the tire.

Figure 16:
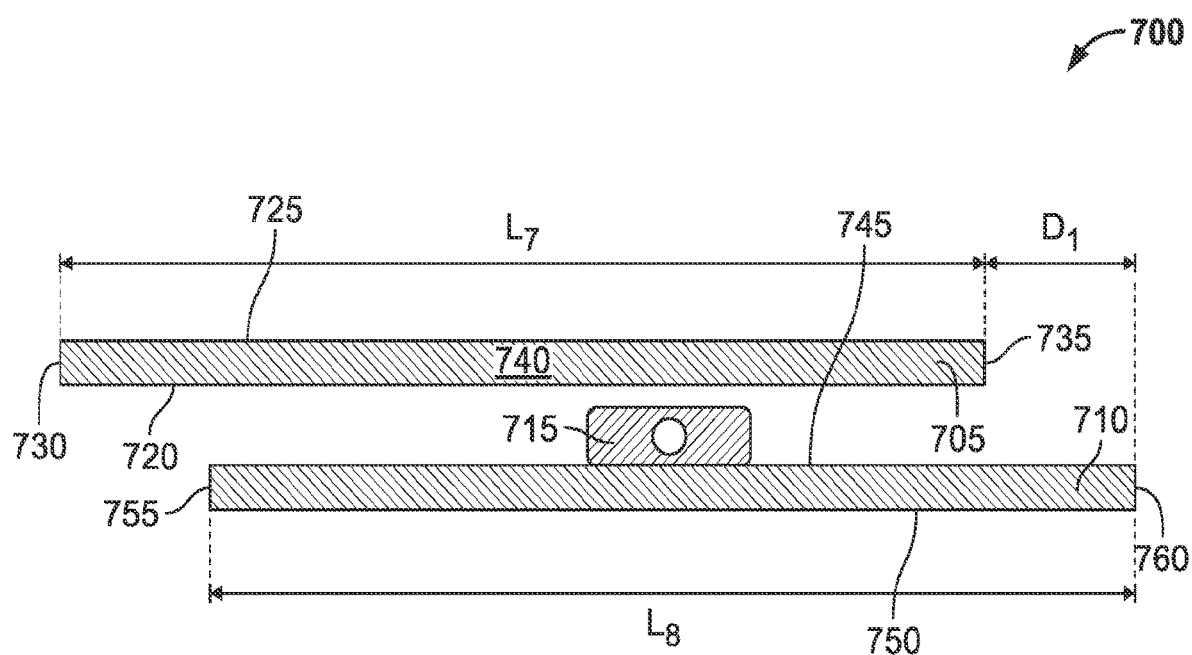
FIG. 16 is an exploded side view of still another embodiment of an RFID package that can be used in the tire of FIG. 1.
Figure 17:
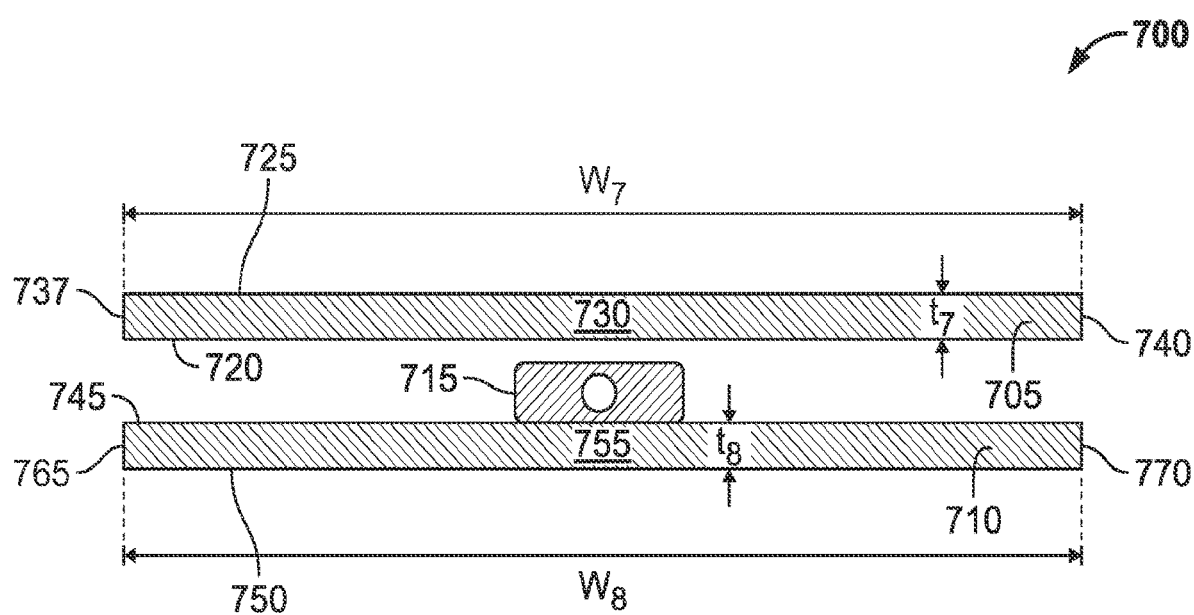
FIG. 17 is an exploded end view of the RFID package of FIG. 16.

FIGS. 16 and 17 show an alternative embodiment of an RFID package 700 that can be installed on a tire. The RFID package 700 includes a first laminate layer 705 and a second laminate layer 710. As used herein, the second laminate layer 710 refers to the layer that engages with a surface of the tire. An RFID chip 715 is sandwiched between the first laminate layer 705 and the second laminate layer 710.

The first laminate layer 705 includes a first surface 720 and a second surface 725 that faces opposite the first surface 720. The first and second surfaces 720, 725 each extend between a first end 730 and a second end 735, as well as between a first side 737 and a second side 740. The first laminate layer 705 has a length $l_7$ that is measured as the distance between the first end 730 and the second end 735, a width $w_7$ that is measured as the distance between the first side 737 and the second side 740, and a thickness $t_7$ that is measured as the distance between the first surface 720 and the second surface 725. It should be understood that the length $l_7$, width $w_7$, and thickness $t_7$ identifiers are provided only to facilitate description of the RFID package 700 and are in no way meant to limit the disclosure of the laminate layer 705 to a particular orientation. In other words, length, for example, is not meant to limit the associated discussion to only the longest extent of the first laminate layer. In the illustrated embodiment, the first laminate layer 705 is provided as a substantially rectangular sheet of material. In alternative embodiments, the first laminate layer may be provided as any desired shape.

The second laminate layer 710 includes a first surface 745 and a second surface 750 that faces opposite the first surface 745. The first and second surfaces 745, 750 each extend between a first end 755 and a second end 760, as well as between a first side 765 and a second side 770. The second laminate layer 710 has a length $l_8$ that is measured as the distance between the first end 755 and the second end 760, a width $w_8$ that is measured as the distance between the first side 765 and the second side 770, and a thickness $t_8$ that is measured as the distance between the first surface 745 and the second surface 750. It should be understood that the length $l_8$, width $w_8$, and thickness $t_8$ identifiers are provided only to facilitate description of the RFID package 700 and are in no way meant to limit the disclosure of the laminate layer to a particular orientation. In other words, length, for example, is not meant to limit the associated discussion to only the longest extent of the second laminate layer. In the illustrated embodiment, the second laminate layer 710 is provided as a substantially rectangular sheet of material. In alternative embodiments, the second laminate layer may be provided as any desired shape.

The dimensions of the first laminate layer 705 are substantially identical to the dimensions of the second laminate layer 710. In other words, the length $l_7$, width $w_7$, and thickness $t_7$ of the first laminate layer 700 is substantially the same as the length $l_8$, width $w_8$, and thickness $t_8$, respectively, of the second laminate layer 710. As shown in FIG. 16, the first laminate layer 705 is offset a distance di from the second laminate layer 710 along the length of the RFID package 700. In the illustrated embodiment, the first and second laminate layers 705, 710 are offset from one another along the length of the RFID package 700, but, as can be seen in FIG. 17, not along the width of the RFID package 700. In alternative embodiments, the first and second laminate layers are offset from one another along the width of the RFID package, but not along the length of the RFID package. In other alternative embodiments, the first and second laminate layers are offset from one another along both the length and the width of the RFID package.

It has been found that in the RFID package 700 of FIGS. 16 and 17, offsetting the laminate layers from one another decreases the possibility of cracks forming in the tire structure during the manufacturing process. Specifically, it has been found that this arrangement can reduce the seam between the laminate layers and an innerliner of a tire. As explained above, this reduction of the seam reduces the occurrence of cracks forming in the tire structure during manufacturing while still providing a robust mounting arrangement that minimizes the chances of the RFID package 700 separating from the tire structure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An RFID package for a tire comprising;
    a first laminate layer having a first length, a first width, and a first thickness;
    a second laminate layer having a second length, a second width, and a second thickness; and
    an RFID chip disposed between the first laminate layer and the second laminate layer;
    wherein the first laminate layer is offset from the second laminate layer along at least one of a length of the RFID package and a width of the RFID package.

2. The RFID package of claim 1, wherein the second length and the second width are equal to the first length and the first width, respectively.

3. The RFID package of claim 2, wherein the second thickness is equal to the first thickness.

4. The RFID package of claim 1, wherein the first laminate layer is offset from the second laminate layer along only the length of the RFID package.

5. The RFID package of claim 1, wherein the first laminate layer is offset from the second laminate layer along only the width of the RFID package.

6. The RFID package of claim 1, wherein the first laminate layer is offset from the second laminate layer along both the length and the width of the RFID package.

7. The RFID package of claim 1, further comprising an adhesive that secures the first laminate layer to the second laminate layer.

8. The RFID package of claim 1, further comprising mechanical fasteners that secure the first laminate layer to the second laminate layer.

9. The RFID package of claim 1, wherein the first laminate layer is secured to the second laminate layer by fusing.

10. A method of manufacturing an RFID package comprising the steps of:
    forming a first laminate layer;

forming a second laminate;
providing an RFID chip between the first laminate layer and the second laminate layer; and
securing the first laminate layer to the second laminate layer;
wherein the step of securing the first laminate layer to the second laminate layer includes offsetting the first laminate layer from the second laminate layer along at least one of a length of the RFID package and a width of the RFID package.

11. The method of claim 10, wherein the step of securing includes at least one of using adhesives, using mechanical fasteners, and fusing.

12. The method of claim 10, wherein the step of forming the first laminate layer includes forming the first laminate layer with a first length, a first width, and a first thickness, and wherein the step of forming the second laminate layer includes forming the second laminate layer with a second length, a second width, and a second thickness, and wherein the first length, the first width, and the first thickness are equal to the second length, the second width, and the second thickness, respectively.

13. The method of claim 10, wherein the step of securing the first laminate layer to the second laminate layer includes offsetting the first laminate layer from the second laminate layer along only the length of the RFID package.

14. The method of claim 10, wherein the step of securing the first laminate layer to the second laminate layer includes offsetting the first laminate layer from the second laminate layer along only the width of the RFID package.

15. The method of claim 10, wherein the step of securing the first laminate layer to the second laminate layer includes offsetting the first laminate layer from the second laminate layer along both the length and the width of the RFID package.

16. An RFID package for a tire comprising;
a first laminate layer having a first central portion and a first peripheral portion, a second laminate layer having a second central portion and a second peripheral portion; and
an RFID chip disposed between the first laminate layer and the second laminate layer;
wherein the first laminate layer is tapered so that a thickness of the first laminate layer continuously decreases from a part of the first central portion located over the RFID chip moving outward toward the first peripheral portion.

17. The RFID package of claim 16, wherein the taper of the first laminate layer gives the first laminate layer a substantially half-moon-shaped cross section.

18. The RFID package of claim 16, wherein the first laminate layer is tapered along a length of the first laminate layer and also a width of the first laminate layer.

19. The RFID package of claim 16, wherein the second laminate layer is tapered so that a thickness of the second central portion is greater than a thickness of the second peripheral portion.

20. The RFID package of claim 16, wherein the taper of the second laminate layer gives the second laminate layer a substantially half-moon-shaped cross section.

* * * * *